March 28, 1939.  D. DOMIZI  2,151,902

GALVANIC CELL AND COVER THEREFOR

Original Filed Jan. 14, 1931

INVENTOR
DARIO DOMIZI
BY
ATTORNEY

Patented Mar. 28, 1939

2,151,902

UNITED STATES PATENT OFFICE 2,151,902

GALVANIC CELL AND COVER THEREFOR

Dario Domizi, Lakewood, Ohio, assignor, by mesne assignments, to Union Carbide and Carbon Corporation, a corporation of New York Original application January 14, 1931, Serial No. 508,788, now Patent No. 2,051,987, dated August 25, 1936. Divided and this application September 21, 1935, Serial No. 41,568. In Great Britain August 27, 1930

6 Claims. (Cl. 136—169)

This is a division of my copending application Serial No. 508,788, filed January 14, 1931, (now Patent 2,051,987, granted August 25, 1936).

This invention relates to primary electric cells and especially to that type of cell having a porous carbon electrode and metal electrodes and in which air permeates the carbon electrode for the purpose of depolarization. It relates especially to such a cell of the deferred action type in which electrolyte-forming material is maintained in the cell where it may be activated by the addition of water to the container. In cases where a caustic material such as hydrated caustic soda is employed as the electrolyte-forming material, means must be provided for preventing moisture from entering the cells since certain electrolyte-forming materials absorb moisture very easily. In some cases it is desirable to include lime in the cell, either in conjunction with the electrolyte-forming material or otherwise. In such cases it is desirable to prevent the atmosphere from reaching the lime which would thereby absorb carbon dioxide from the air.

It is accordingly an object of my invention to provide a cell having an improved seal for preventing the entrance of moisture before the cell is placed in use. A further object of the invention is to provide an improved cover for such a cell.

Figure 1:
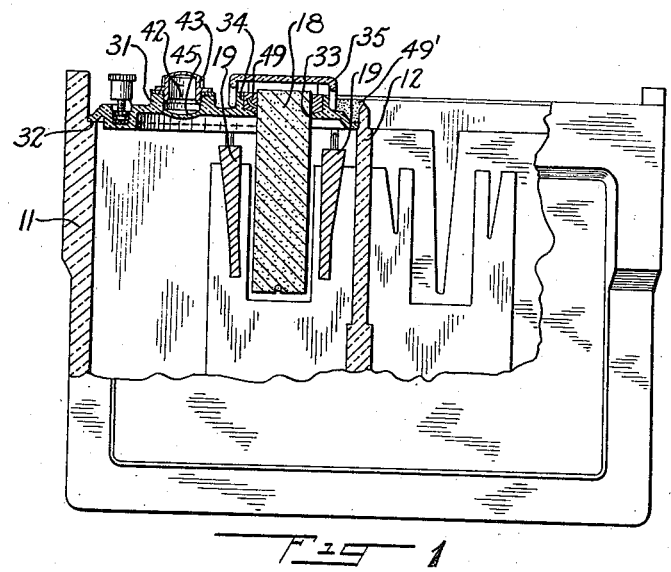
Figure 2:
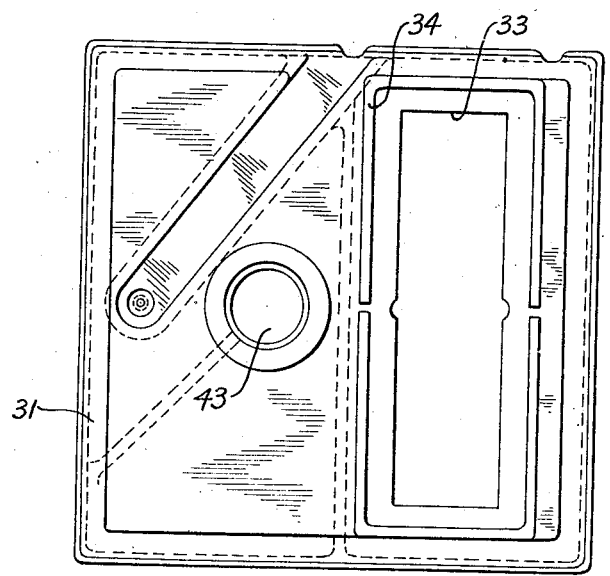

These and other objects of my invention will in part be obvious and will be pointed out in the following specification having reference to the accompanying drawing in which Fig. 1 is a longitudinal partial section of a two-cell battery illustrating one embodiment of my invention and Fig. 2 is a top view of the cover of one of the cells constituting said battery.

In Fig. 1 I show two cells, constructed in accordance with my invention, assembled in a unitary casing. In the right hand cell the cover and electrodes are removed. The casing 11 is provided with a central wall 12 dividing the two cells. This wall is of insulating material and is preferably integral with the casing 11. Within the cells are the electrodes 18 and 19. These electrodes are supported in any suitable manner but preferably in the manner shown in the accompanying drawing and described in detail in U. S. Patent No. 2,051,987. The cover 31 engages the walls of the cell container and rests upon a shoulder 32 provided therefor. The cover is provided with an opening 33 through which the electrode 18 projects. Surrounding the electrode 18 and the opening 33 is a ridge 34 which serves to hold in place a protective cover 35 and serves as a dam for plastic seal 49. This permits the use of a soft seal, having a lower melting point, around the carbon electrode. This is desirable since the use of a seal having a high melting point might injure the electrode. Moreover, this seal need not be as hard as that elsewhere since it is protected by the electrode cover 35.

To seal the cell more securely sealing means 49' may be provided. This is preferably of higher melting point than the sealing means 49 adjacent the carbon electrode.

In cells of the type described herein it has been found advantageous to cast a block of electrolyte-forming material, such as the monohydrate of caustic soda, about the electrodes. This forms a protection for the electrodes during shipment and has numerous other advantages. This material takes up water very readily and it is desirable that the battery should be sealed during shipment. At the same time it is desirable that the seal should be easily broken to permit the addition of water which dissolves the electrolyte forming material. To secure the desired result I provide a filling opening 42 on which is secured a cap 43. In order to close this opening during shipment, especially since the cap 43 must be provided with a venting opening, I provide a thin diaphragm 45 homogeneous and integral with the top. This diaphragm is relatively thin and can easily be broken away when it is desired to fill the cell for use. This diaphragm being of the same material as the cell cover, is inert and the pieces may be allowed to fall into the cell.

I claim:

1. A primary cell comprising a container, a cover and electrodes, said cover being sealed to said container and provided with an aperture for filling, said aperture being closed by an imperforate frangible diaphragm integral and homogeneous with the cover.

2. A primary cell comprising a container, a cover and electrodes, said cover being sealed to cover and electrodes, said cover being sealed to said container and provided with an aperture for filling said container, said aperture being closed by an imperforate frangible diaphragm integral and homogeneous with the cover, said cover being provided with means surrounding said aperture for receiving a vent cap, and a vent cap provided with an opening smaller than said aperture engaging said last-mentioned means.

3. A cover for a primary cell composed of a non-conducting material not affected by the electrolyte of said cell, said cover being provided with a filling opening and an imperforate diaphragm closing said opening, said diaphragm being integral and homogeneous with said cover and of less thickness than any other part of the cover.

4. An article of manufacture adapted for use as a cover for a galvanic cell consisting of a plate of non-conductive material having a relatively large opening through which an electrode may extend, a raised portion surrounding said opening, and an aperture spaced from said opening, said aperture being closed by a frangible diaphragm integral and homogeneous with said plate.

5. An electrolytic cell cover provided with a well at the bottom of which is a diaphragm homogeneous with said cover and adapted to seal said well until broken to convert said well into a filling opening, and a cap associated with said well and protecting said diaphragm from accidental breakage, said cap having a vent for communication with said filling opening.

6. An electrolytic cell cover provided with a recess within which is a brittle diaphragm homogeneous with said cover for sealing said recess until broken to provide a filling opening, and a protective vent cap for said filling opening.

DARIO DOMIZI.